(No Model.)

A. S. BOWLEY.
TIRE FOR VELOCIPEDES.

No. 442,948. Patented Dec. 16, 1890.

Witnesses:
J. N. Shumway
L. D. Kelsey

Arthur Sydney Bowley
Inventor
By Attys.
Earle Seymour

UNITED STATES PATENT OFFICE.

ARTHUR SYDNEY BOWLEY, OF LONDON, ENGLAND, ASSIGNOR TO THE OVERMAN WHEEL COMPANY, OF CHICOPEE FALLS, MASSACHUSETTS.

TIRE FOR VELOCIPEDES.

SPECIFICATION forming part of Letters Patent No. 442,948, dated December 16, 1890.

Application filed October 6, 1890. Serial No. 367,170. (No model.) Patented in England May 8, 1889, No. 7,734.

*To all whom it may concern:*

Be it known that I, ARTHUR SYDNEY BOWLEY, of Balham Grove, Balham, London, in the county of Surrey, England, have invented new Improvements in Tires for Velocipedes and Like Vehicles, (which has been patented in Great Britain May 8, 1889, No. 7,734;) and I do hereby declare the following, when taken in connection with accompanying drawings and the letters of reference marked thereon, to be a full, clear, and exact description of the same.

My invention relates to an improvement in pneumatic tires for velocipedes, the object being to utilize the tires themselves in automatically maintaining the required pressure of air within them.

With these ends in view my invention consists in the combination, with a yielding hollow tire, of an air-pump arranged to be operated by motion derived from the inward displacement of the tire under pressure.

My invention further consists in certain details of construction and combinations of parts, as will be hereinafter described, and pointed out in the claims.

Figure 1:
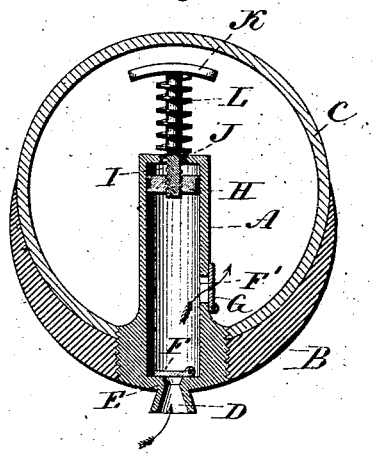
Figure 2:
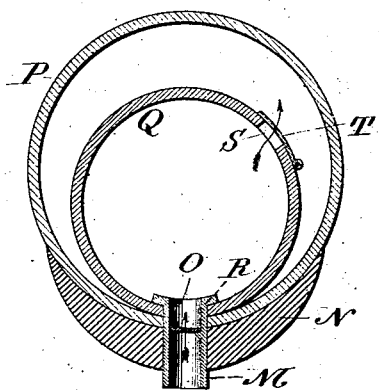

In the accompanying drawings, Figure 1 is a view in transverse section of one form which a tire constructed in accordance with my invention may assume, and Fig. 2 is a modified form thereof.

As shown by Fig. 1 of the drawings, a tube A, forming the cylinder of the automatic air-pump, is removably mounted in the center of the rim B and extends radially outward into the hollow tubular tire C, which, with the rim, may be of any approved construction, the inner end of the tube being enlarged and threaded to adapt it to be mounted in the said rim. A funnel D, located at the extreme inner end of the tube, leads into an inlet-port E, closed from the inside by a valve F, which opens to let air into the tube, but closes to prevent the escape of air therefrom. An outlet-port F', leading from the side of the tube into the interior of the tire, is closed by an outlet-valve G, which opens for the passage of compressed air through it from the tube into the tire, but closes against the flow of air in the opposite direction. A piston H, located in the outer end of the tube, is furnished with an outwardly-extending longitudinally-adjustable piston-rod I, which passes through a small opening J, formed in the said end of the tube, either the opening or the piston-rod being packed in any suitable manner. As herein shown, the piston-rod is made longitudinally adjustable by threading its inner end into the piston; but the same result may be reached in other ways. An operating-face K, secured to the outer end of the piston-rod, is designed for engagement by the tire, which when inwardly displaced forces the rod and piston inwardly against the tension of a spiral spring L, encircling the rod and interposed between the extreme outer end of the tube and the said operating-face.

Assuming the tire to have been filled with compressed air before any use of the machine, then when the pressure of air therein is reduced to an extent requiring correction the tire will at that time by contact with the ground at each revolution of the wheel be so far inwardly displaced as to engage with the operating-face on the piston-rod and force the same inward, whereby the air in the tube or cylinder is compressed and forced into the tire through the outlet-port, which is immediately after said contact closed by the pressure of confined air in the main body of the tire. Air will thus be compressed in the tube and forced into the tire until the pressure therein has been so far increased that it will prevent the inward displacement of the tire essential to the operation of the pump, which thus derives its motive power from the tire and becomes automatic in its action. One or more of these pumps may be employed, as desired, and they will operate with every revolution of the wheel so long as the pressure within the tire is below the pressure determined upon and required for a right cushioning action of the tire. By providing for the longitudinal adjustment of the piston-rod the pump may be regulated or set to maintain the pressure within the tire at a high or moderate, or even low, degree of inflation, according to the character of riding to be done or the pleasure of the rider, for it is clear that the nearer the outer end of the rod is to the tire the quicker the pump will be caused to act, and vice versa. I do not, however, confine myself to regulating the action of the pump through the medium of the piston-rod, which is adjusted, as shown, by first removing the pump and then screwing the rod into or out of the piston.

As shown by Fig. 2 of the drawings, a small short tube M, mounted in the rim N, contains an inlet-valve O, opening inwardly, and extends at its outer end through the hollow tire P and through a rubber ball Q, which is located therein and held in place, so as to be normally cleared from the outer portions of the tire by a flange R, formed at the said outer end of the tube. An outlet-port S, formed in the ball, is closed by a valve T, hinged to the outer face thereof and opening only when the pressure within the tube exceeds that in the tire, which when displaced inwardly, owing to a reduction of the pressure of the air within it below the pressure required for the desired action of the tire, engages with the ball and compresses the air within, and so raises the pressure within the tire to its normal point.

It is apparent that the air-pump may still take other forms than those shown. I would therefore have it understood that I do not limit myself to the forms of air-pump shown and described, but hold myself at liberty to make such changes and alterations as fairly fall within the spirit and scope of my invention.

Having fully described my invention, what I claim as new, and desire to secure by Letters Patent, is—

1. The combination, with a yielding hollow tire, of an air-pump arranged to be automatically operated by motion derived from the inward displacement of the tire under pressure, substantially as described.

2. The combination, with a yielding hollow tire, of an air-pump arranged to be automatically operated by motion derived from the inward displacement of the tire under pressure and adapted to be regulated in its pumping action, substantially as described.

3. The combination, with a yielding hollow tire, of a tube extending thereinto, a piston located in the outer end of the tube and having its rod extended into the range of the tire when inwardly displaced, a spring for holding the piston and its rod in their normal positions of readiness to be operated by the tire, and inlet and outlet valves respectively controlling port-openings from the tube to the air and to the tire, substantially as described.

In witness whereof I have hereunto set my hand in presence of two witnesses.

ARTHUR SYDNEY BOWLEY.

Witnesses:
ALF. C. WHITE,
17 Southampton Bdgs., London, W. C.
JOSEPH LAKE,
17 Gracechurch Street, London.